United States Patent
Newcombe et al.

(10) Patent No.: US 8,401,225 B2
(45) Date of Patent: Mar. 19, 2013

(54) MOVING OBJECT SEGMENTATION USING DEPTH IMAGES

(75) Inventors: Richard Newcombe, Nuneaton (GB); Shahram Izadi, Cambridge (GB); Otmar Hilliges, Cambridge (GB); David Kim, Cambridge (GB); David Molyneaux, Oldham (GB); Jamie Daniel Joseph Shotton, Cambridge (GB); Pushmeet Kohli, Cambridge (GB); Andrew Fitzgibbon, Cambridge (GB); Stephen Edward Hodges, Cambridge (GB); David Alexander Butler, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 235 days.

(21) Appl. No.: 13/017,626

(22) Filed: Jan. 31, 2011

(65) Prior Publication Data
US 2012/0195471 A1   Aug. 2, 2012

(51) Int. Cl.
 *G06K 9/00* (2006.01)
(52) U.S. Cl. ..................... 382/100
(58) Field of Classification Search .......... 382/100–107; 348/154, 155, 169–171; 73/488–491; 356/27–31
 See application file for complete search history.

(56) References Cited

U.S. PATENT DOCUMENTS

| | | | |
|---|---|---|---|
| 4,627,620 A | 12/1986 | Yang | |
| 4,630,910 A | 12/1986 | Ross et al. | |
| 4,645,458 A | 2/1987 | Williams | |
| 4,695,953 A | 9/1987 | Blair et al. | |
| 4,702,475 A | 10/1987 | Elstein et al. | |
| 4,711,543 A | 12/1987 | Blair et al. | |
| 4,751,642 A | 6/1988 | Silva et al. | |
| 4,796,997 A | 1/1989 | Svetkoff et al. | |

(Continued)

FOREIGN PATENT DOCUMENTS

| CN | 201254344 B | 6/2010 |
|---|---|---|
| EP | 0583061 A2 | 2/1994 |

(Continued)

OTHER PUBLICATIONS

J. Ziegler et al. "Tracking of the articulated upper body on multi-view stereo image sequences," Proceedings of the 2006 IEEE Computer Society Conference on Computer Vision and Pattern Recognition (CVPR'06) 0-7695-2597-0/06 $20.00 © 2006 IEEE.*

(Continued)

*Primary Examiner* — Atiba O Fitzpatrick
(74) *Attorney, Agent, or Firm* — Zete Law, P.L.L.C.; MacLane C. Key

(57) ABSTRACT

Moving object segmentation using depth images is described. In an example, a moving object is segmented from the background of a depth image of a scene received from a mobile depth camera. A previous depth image of the scene is retrieved, and compared to the current depth image using an iterative closest point algorithm. The iterative closest point algorithm includes a determination of a set of points that correspond between the current depth image and the previous depth image. During the determination of the set of points, one or more outlying points are detected that do not correspond between the two depth images, and the image elements at these outlying points are labeled as belonging to the moving object. In examples, the iterative closest point algorithm is executed as part of an algorithm for tracking the mobile depth camera, and hence the segmentation does not add substantial additional computational complexity.

20 Claims, 7 Drawing Sheets

U.S. PATENT DOCUMENTS

| | | |
|---|---|---|
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,696,591 A | 12/1997 | Bilhorn et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,504,569 B1 | 1/2003 | Jasinschi et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,940,538 B2 | 9/2005 | Rafey et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,135,992 B2 | 11/2006 | Karlsson et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,366,325 B2 | 4/2008 | Fujimura et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,697,748 B2 | 4/2010 | Dimsdale et al. |
| 7,701,439 B2 | 4/2010 | Hillis et al. |
| 7,702,130 B2 | 4/2010 | Im et al. |

| | | | |
|---|---|---|---|
| 7,704,135 | B2 | 4/2010 | Harrison, Jr. |
| 7,710,391 | B2 | 5/2010 | Bell et al. |
| 7,729,530 | B2 | 6/2010 | Antonov et al. |
| 7,746,345 | B2 | 6/2010 | Hunter |
| 7,760,182 | B2 | 7/2010 | Ahmad et al. |
| 7,809,167 | B2 | 10/2010 | Bell |
| 7,834,846 | B1 | 11/2010 | Bell |
| 7,852,262 | B2 | 12/2010 | Namineni et al. |
| RE42,256 | E | 3/2011 | Edwards |
| 7,898,522 | B2 | 3/2011 | Hildreth et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 2003/0067461 | A1 | 4/2003 | Fletcher et al. |
| 2004/0075738 | A1 | 4/2004 | Burke et al. |
| 2004/0167667 | A1 | 8/2004 | Goncalves et al. |
| 2004/0233287 | A1 | 11/2004 | Schnell |
| 2005/0238200 | A1 | 10/2005 | Gupta et al. |
| 2006/0221250 | A1 | 10/2006 | Rossbach et al. |
| 2007/0052807 | A1 | 3/2007 | Zhou et al. |
| 2007/0116356 | A1 | 5/2007 | Gong et al. |
| 2007/0156286 | A1 | 7/2007 | Yamauchi |
| 2008/0026838 | A1 | 1/2008 | Dunstan et al. |
| 2008/0060854 | A1 | 3/2008 | Perlin |
| 2008/0152191 | A1 | 6/2008 | Fujimura et al. |
| 2008/0304707 | A1 | 12/2008 | Oi et al. |
| 2010/0085352 | A1 | 4/2010 | Zhou et al. |
| 2010/0085353 | A1 | 4/2010 | Zhou et al. |
| 2010/0094460 | A1 | 4/2010 | Choi et al. |
| 2010/0103196 | A1 | 4/2010 | Kumar et al. |
| 2010/0111370 | A1 | 5/2010 | Black et al. |
| 2010/0278384 | A1 | 11/2010 | Shotton et al. |
| 2010/0281432 | A1 | 11/2010 | Geisner et al. |
| 2010/0302395 | A1 | 12/2010 | Mathe et al. |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | 99/44698 A1 | 9/1999 |

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202, The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", in Proceedings of the Gesture Workshop, 1998, pp. 285-296, Germany.

Kohler, "Vision Based Remote Control in Intelligent Home Environments", University of Erlangen-Nuremberg/ Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

U.S. Appl. No. 12/367,665, filed Feb. 9, 2009, "Camera Based Motion Sensing System".

U.S. Appl. No. 12/790,026, filed May 28, 2010, "Foreground and Background Image Segmentation".

U.S. Appl. No. 12/877,595, filed Sep. 8, 2010, "Depth Camera Based on Structured Light and Stereo Vision".

Baltzakis, et al., "Tracking of human hands and faces through probabilistic fusion of multiple visual cues", retrieved on Nov. 28, 2010 at <<http://citeseerx.ist.psu.edu/viewdoc/download?doi=10.1.1.158.8443&rep=rep1&type=pdf>>, IEEE, Intl Conference on Computer Vision Systems (ICVS), Santorini, Greece, May 2008, pp. 1-10.

Benko, et al., "Depth Touch: Using Depth-Sensing Camera to Enable Freehand Interactions on and Above the Interactive Surface", retrieved on Nov. 28, 2010 at <<http://research.microsoft.com/en-us/um/people/benko/publications/2008/DepthTouch_poster.pdf>>, IEEE Tabletops and Interactive Surfaces, Amsterdam, the Netherlands, Oct. 2008, pp. 1.

Besl, et al., "A Method for Registration of 3-D Shapes", IEEE Transactions on Pattern Analysis and Machine Intelligence, vol. 14, No. 2, Feb. 1992, pp. 239-256.

Blais, et al., "Registering Multiview Range Data to Create 3D Computer Objects", IEEE Transactions on Pattern Analysis and Machine Intelligence, vol. 17, No. 8, Aug. 1995, pp. 820-824.

Boehnke, "Fast Object Localization with Real Time 3D Laser Range Sensor Simulation", retrieved on Nov. 24, 2010 at <<http://www.wseas.us/e-library/transactions/electronics/2008/Paper%204%20BOEHNKE.pdf>>, WSEAS Transactions on Electronics, vol. 5, No. 3, Mar. 2008, pp. 83-92.

Bolitho, et al., "Parallel Poisson Surface Reconstruction", retrieved on Nov. 29, 2010 at <<http://www.cs.jhu.edu/~misha/MyPapers/ISVC09.pdf>>, Springer-Verlag Berlin, Proceedings of Intl Symposium on Advances in Visual Computing: Part I (ISVC), Nov. 2010, pp. 678-689.

Bolitho, "The Reconstruction of Large Three-dimensional Meshes", retrieved on Nov. 29, 2010 at <<http://www.cs.jhu.edu/~misha/Bolitho/Thesis.pdf>>, Johns Hopkins University, PhD Dissertation, Mar. 2010, pp. 1-171.

Botterill, et al., "Bag-of-Words-driven Single Camera SLAM", retrieved on Nov. 26, 2010 at <<http://www.hilandtom.com/tombotterill/Botterill-Mills-Green-2010-BoWSLAM.pdf>>, Journal on Image and Video Processing, Aug. 2010, pp. 1-18.

Broll, et al., "Toward Next-Gen Mobile AR Games", retrieved on Nov. 24, 2010 at <<http://ieeexplore.ieee.org/stamp/stamp.jsp?tp=&arnumber=4557954>>, IEEE Computer Society, IEEE Computer Graphics and Applications, vol. 28, No. 4, 2008, pp. 40-48.

Campbell, et al., "Automatic 3D Object Segmentation in Multiple Views using Volumetric Graph-Cuts", Butterworth-Heinemann, Newton, MA, Image and Vision Computing, vol. 28, No. 1, Jan. 2010, pp. 14-25.

Carmody, "How Motion Detection Works in Xbox Kinect", retrieved on Nov. 29, 2010 at <<http://gizmodo.com/5681078/how-motion-detection-works-in-xbox-kinect>>, Gizmo.com. Nov. 3, 2010, pp. 1-4.

Chen, et al., "Object Modeling by Registration of Multiple Range Images", IEEE Proceedings of Intl Conference on Robotics and Automation, Sacramento, California , Apr. 1991, pp. 2724-2729.

Cheung, et al., "Robust Background Subtraction with Foreground Validation for Urban Traffic Video", retrieved on Nov. 28, 2010 at <<http://downloads.hindawi.com/journals/asp/2005/726261.pdf>>, Hindawi Publishing, EURASIP Journal on Applied Signal Processing, vol. 14, 2005, pp. 2330-2340.

Cohen, et al., "Interactive Fluid-Particle Simulation using Translating Eulerian Grids", ACM SIGGRAPH, Proceedings of Symposium on Interactive 3D Graphics and Games (I3D), 2010, pp. 15-22.

Curless, et al., "A Volumetric Method for Building Complex Models from Range Images", ACM SIGGRAPH, Proceedings of Conference on Computer Graphics and Interactive Techniques, New Orleans, LA, Aug. 1996, pp. 303-312.

Cutts, "Matt Cutts: Gadgets, Google, and SEO", retrieved on Nov. 30, 2010 at <<http://www.mattcutts.com/blog/>> Google/SEO, Nov. 2010, 10 pages.

Davison, et al., "Mobile Robot Localisation using Active Vision", Springer, LNCS vol. 1407, No. II, Proceedings of European Conference on Computer Vision, Freiburg, Germany, 1998, pp. 809-825.

de la Escalera, et al., "Automatic Chessboard Detection for Intrinsic and Extrinsic Camera Parameter Calibration", retrieved on Nov. 29, 2010 at <<http://www.mdpi.com/1424-8220/10/3/2027/pdf>>, Sensors, vol. 10, No. 3, 2010, pp. 2027-2044.

Elfes, et al., "Sensor Integration for Robot Navigation: Combining Sonar and Stereo Range Data in a Grid-Based Representation", IEEE, Proceedings of Conference on Decision and Control, Los Angeles, California, Dec. 1987, pp. 1802-1807.

Frahm, et al., "Building Rome on a Cloudless Day", Springer-Verlag Berlin, Proceedings of European Conference on Computer Vision: Part IV (ECCV), 2010, pp. 368-381.

Fujii, et al., "Three-dimensional finger tracking using direct and reflected infrared images", retrieved on Nov. 29, 2010 at <<http://www.acm.org/uist/archive/adjunct/2002/pdf/posters/p27-fujii.pdf>>, ACM, Symposium on User Interface Software and Technology (UIST), Paris, France, Oct. 2002, pp. 27-28.

Furukawa, et al., "Towards Internet-scale Multi-view Stereo", IEEE Computer Society, Proceedings of Conference on Computer Vision and Pattern Recognition (CVPR), San Francisco, California, Jun. 2010, pp. 1434-1441.

Goesele, et al., "Multi-View Stereo Revisited", IEEE Computer Society, Proceedings of Conference on Computer Vision and Pattern Recognition (CVPR), New York, NY, vol. 2, 2006, pp. 2402-2409.

Hadwiger, et al., "Advanced Illumination Techniques for GPU-Based Volume Raycasting", ACM SIGGRAPH, Intl Conference on Computer Graphics and Interactive Techniques, 2009, pp. 1-56.

Harada, "Real-Time Rigid Body Simulation on GPUs", retrieved on Apr. 18, 2011 at <<http.developer.nvidia.com/GPUGems3/gpugems3_ch29.html, Nvidia, GPU Gems 3, Chapter 29, 2008, pp. 1-21.

Henry, et al., "RGB-D Mapping: Using Depth Cameras for Dense 3D Modeling of Indoor Environments", ISER, 2010, pp. 1-2.

Herath, et al., "Simultaneous Localisation and Mapping: A Stereo Vision Based Approach", retrieved on Nov. 26, 2010 at <<http://ieeexplore.ieee.org/stamp/stamp.jsp?tp=&arnumber=4058480>>, IEEE, Intl Conference on Intelligent Robots and Systems, Beijing, China, Oct. 2006, pp. 922-927.

Hirsch, et al., "BiDi Screen: A Thin, Depth-Sensing LCD for 3D Interaction using Light Fields", retrieved on Nov. 29, 2010 at <<http://src.acm.org/2010/MatthewHirsch/BiDiScreen/BiDi%20Screen.htm, ACM SIGGRAPH Asia , Transactions on Graphics (TOG), vol. 28, No. 5, Dec. 2009, pp. 1-7.

Hogue, et al., "Underwater environment reconstruction using stereo and inertial data", retrieved on Nov. 29, 2010 at <<http://ieeexplore.ieee.org/stamp/stamp.jsp?arnumber=04413666>>, IEEE Intl Conference on Systems, Man and Cybernetics, Montreal, Canada, Jan. 2008, pp. 2372-2377.

Jivet, et al., "Real Time Representation of 3D Sensor Depth Images", retrieved on Nov. 28, 2010 at <<http://www.wseas.us/e-library/transactions/electronics/2008/Paper%202%20JIVET.pdf>>, WSEAS Transactions on Electronics, vol. 5, No. 3, Mar. 2008, pp. 65-71.

Kazhdan, et al., "Poisson Surface Reconstruction", Eurographics Symposium on Geometry Processing, 2006, pp. 61-70.

Kil, et al., "GPU-assisted Surface Reconstruction on Locally-Uniform Samples", retrieved on Nov. 29, 2010 at <<http://graphics.cs.ucdavis.edu/~yjkil/pub/psurface/Kil.PS.IMR08.pdf>>, Proceedings of Intl Meshing Roundtable, 2008, pp. 369-385.

Kim, et al., "Relocalization Using Virtual Keyframes for Online Environment Map Construction", retrieved on Nov. 26, 2010 at <<http://www.cs.ucsb.edu/~holl/pubs/Kim-2009-VRST.pdf>>, ACM, Proceedings of Symposium on Virtual Reality Software and Technology (VRST), Kyoto, Japan, Nov. 2009, pp. 127-134.

Klein, et al., "Parallel Tracking and Mapping for Small AR Workspaces", IEEE, Intl Symposium on Mixed and Augmented Reality, Nov. 2007, ISMAR, Nara, Japan, pp. 225-234.

Le Grand, "Broad-Phase Collision Detection with CUDA", retrieved on Apr. 2, 2011 at <<http.developer.nvidia.comIGPUGems3/gpugems3ch32.html>>, Nvidia, GPU Gems 3, Chapter 32, 2008, pp. 1-24.

Levoy, et al., "The Digital Michelangelo Project: 3D Scanning of Large Statues", ACM SIGGRAPH, New Orleans, LA, 2000, pp. 131-144.

Lorensen, et al., "Marching Cubes: A High Resolution 3D Surface Construction Algorithm", Computer Graphics, vol. 21, No. 4, Jul. 1987, pp. 163-169.

Michel, et al., "GPU-accelerated Real-Time 3D Tracking for Humanoid Locomotion and Stair Climbing", retrieved on Nov. 24, 2010 at <<http://ieeexplore.ieee.org/stamp/stamp.jsp?tp=8,arnumber=4399104>>, IEEE, Proceedings of IEEE/RSJ Intl Conference on Intelligent Robots and Systems, San Diego, California, Nov. 2007, pp. 463-469.

Molchanov, et al., "Non-iterative Second-order Approximation of Signed Distance Functions for Any Isosurface Representation", retrieved on Nov. 29, 2010 at <<http://www.paul-rosenthal.de/wp-content/uploads/2010/06/molchanov_eurovis_2010.pdf>>, Blackwell Publishing, Eurographics/ IEEE-VGTC Symposium on Visualization, vol. 29, No. 3, 2010, pp. 1-10.

Newcombe, et al., "Live Dense Reconstruction with a Single Moving Camera", IEEE Computer Society, Proceedings of Conference on Computer Vision and Pattern Recognition (CVPR), 2010, pp. 1498-1505.

Osher, et al., "Level Set Methods and Dynamic Implicit Surfaces, Signed Distance Functions", Springer-Verlag New York, Applied Mathematical Sciences, Chapter 2, 2002, pp. 17-22.

Parker, et al., "Interactive Ray Tracing for Isosurface Rendering", IEEE Computer Society, Proceedings of Conference on Visualization (VIS), 1998, pp. 233-238 and 538.

Pollefeys, et al., "Detailed Real-Time Urban 3D Reconstruction From Video", Kluwer Academic Publishers, International Journal of Computer Vision, vol. 78, No. 2-3, Jul. 2008, pp. 143-167.

Purcell, et al., "Ray Tracing on Programmable Graphics Hardware", ACM Transactions on Graphics, vol. 1, No. 3, Jul. 2002, pp. 268-277.

Rusinkiewicz, et al., "Real-Time 3D Model Acquisition", ACM SIGGRAPH, Proceedings of Conference on Computer Graphics and Interactive Techniques, 2002, pp. 438-446.

Seitz, et al., "A Comparison and Evaluation of Multi-View Stereo Reconstruction Algorithms", IEEE Computer Society, Proceedings of Conference on Computer Vision and Pattern Recognition (CVPR), vol. 1, 2006, pp. 519-528.

Stein, et al., "Structural Indexing: Efficient 3-D Object Recognition", IEEE Transactions on Pattern Analysis and Machine Intelligence, vol. 14, No. 2, Feb. 1992, pp. 125-145.

Stuhmer, et al., "Real-Time Dense Geometry from a Handheld Camera", Springer-Verlag Berlin, LNCS 6376, Conference on Pattern Recognition (DAGM), 2010, pp. 11-20.

Thrun, et al., "Probabilistic Robotics", The MIT Press, Chapter 9, Sep. 2005, pp. 281-335.

van Dam, et al., "Immersive VR for Scientific Visualization: A Progress Report", retrieved on Nov. 24, 2010 at <<http://ieeexplore.ieee.org/stamp/stamp.jsp?tp=&arnumber=888006>>, IEEE Computer Society, IEEE Computer Graphics and Applications, vol. 20, No. 6, Nov. 2000, pp. 26-52.

Vaughan-Nichols, "Game-Console Makers Battle over Motion-Sensitive Controllers", retrieved on Nov. 24, 2010 at <<http://ieeexplore.ieee.org/stamp/stamp.jsp?tp=&arnumber=5197417>>, IEEE Computer Society, Computer, Aug. 2009, pp. 13-15.

Vidal, et al., "Pursuit-Evasion Games with Unmanned Ground and Aerial Vehicles", retrieved on Nov. 24, 2010 at <<http://ieeexplore.ieee.org/stamp/stamp.jsp?tp=&arnumber=933069>>, IEEE, Proceedings of IEEE Intl Conference on Robotics and Automation, Seoul, Korea, May 2001, pp. 2948-2955.

Vogiatzis, et al., "Reconstructing relief surfaces", Elsevier Press, Image and Vision Computing, vol. 26, 2008, pp. 397-404.

Welch, et al., "Motion Tracking: No Silver Bullet, but a Respectable Arsenal", retrieved on Nov. 24, 2010 at <<http://ieeexplore.ieee.org/stamp/stamp.jsp?tp=&arnumber=1046626>>, IEEE Computer Society, IEEE Computer Graphics and Applications, vol. 22, No. 6, Nov. 2002, pp. 24-38.

Williams, et al., "Real-Time SLAM Relocalisation", retrieved on Nov. 26, 2010 at <<http://www.robots.ox.ac.uk:5000/~lav/Papers/williams_etal_iccv2007/williams_etal_iccv2007.pdf>>, IEEE, Proceedings of Intl Conference on Computer Vision (ICCV), Rio de Janeiro, Brazil, Oct. 2007, pp. 1-8.

Wilson, et al., "Combining Multiple Depth Cameras and Projectors for Interactions On, Above, and Between Surfaces", retrieved on Nov. 29, 2010 at <<http://research.microsoft.com/en-us/um/people/awilson/publications/wilsonuist2010/Wilson%20UIST%202010%20LightSpace.pdf>>, ACM, Proceedings of Symposium on User Interface Software and Technology (UIST), New York, NY, Oct. 2010, pp. 273-282.

Wurm, et al., "OctoMap: A Probabilistic, Flexible, and Compact 3D Map Representation for Robotic Systems", Proceedings of Workshop on Best Practice in 3D Perception and Modeling for Mobile Manipulation (ICRA), Anchorage, Alaska, May 2010, 8 pages.

Yu, et al., "Monocular Video Foreground/Background Segmentation by Tracking Spatial-Color Gaussian Mixture Models", retrieved on Nov. 28, 2010 at <<http://research.microsoft.com/en-us/um/people/cohen/segmentation.pdf>>, IEEE, Proceedings of Workshop on Motion and Video Computing (WMVC), Feb. 2007, pp. 1-8.

Zach, et al., "A Globally Optimal Algorithm for Robust TV-L1 Range Image Integration", IEEE Proceedings of Intl Conference on Computer Vision (ICCV), 2007, pp. 1-8.

Zhou, et al., "Data-Parallel Octrees for Surface Reconstruction", IEEE Transactions on Visualization and Computer Graphics, vol. 17, No. 5, May 2011, pp. 669-681.

Zhou, et al., "Highly Parallel Surface Reconstruction", retrieved on Nov. 29, 2010 at <<http://research.microsoft.com/pubs/70569/tr-2008-53.pdf, Microsoft Corporation, Microsoft Research, Technical Report MSR-TR-2008-53, Apr. 2008, pp. 1-10.

* cited by examiner

MOVING OBJECT SEGMENTATION USING DEPTH IMAGES

BACKGROUND

Three-dimensional computer models of a real-world environment are useful in a wide variety of applications. For example, such models can be used in applications such as immersive gaming, augmented reality, architecture/planning, robotics, and engineering prototyping. Depth cameras (also known as z-cameras) can generate real-time depth maps of a real-world environment. Each pixel in these depth maps corresponds to a discrete distance measurement captured by the camera from a 3D point in the environment. This means that these cameras provide depth maps which are composed of an unordered set of points (known as a point cloud) at real-time rates.

In addition to creating the depth map representation of the real-world environment, it is useful to be able to perform a segmentation operation that differentiates individual objects in the environment. For example, a coffee cup placed on a table is a separate object to the table, but the depth map in isolation does not distinguish this as it is unable to differentiate between an object placed on the table and something that is part of the table itself.

Segmentation algorithms exist, such as those based on machine-learning classifiers or computer vision techniques. Such algorithms are able to differentiate certain objects in an image, and label the associated pixels accordingly. However, these algorithms can be computationally complex and hence demand substantial computational resources, especially to perform the segmentation on real-time depth maps.

The embodiments described below are not limited to implementations which solve any or all of the disadvantages of known segmentation techniques.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Moving object segmentation using depth images is described. In an example, a moving object is segmented from the background of a depth image of a scene received from a mobile depth camera. A previous depth image of the scene is retrieved, and compared to the current depth image using an iterative closest point algorithm. The iterative closest point algorithm includes a determination of a set of points that correspond between the current depth image and the previous depth image. During the determination of the set of points, one or more outlying points are detected that do not correspond between the two depth images, and the image elements at these outlying points are labeled as belonging to the moving object. In examples, the iterative closest point algorithm is executed as part of an algorithm for tracking the mobile depth camera, and hence the segmentation does not add substantial additional computational complexity.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a computer gaming system, the system described is provided as an example and not a limitation. As those skilled in the art will appreciate, the present examples are suitable for application in a variety of different types of computing systems using 3D models.

Figure 1:
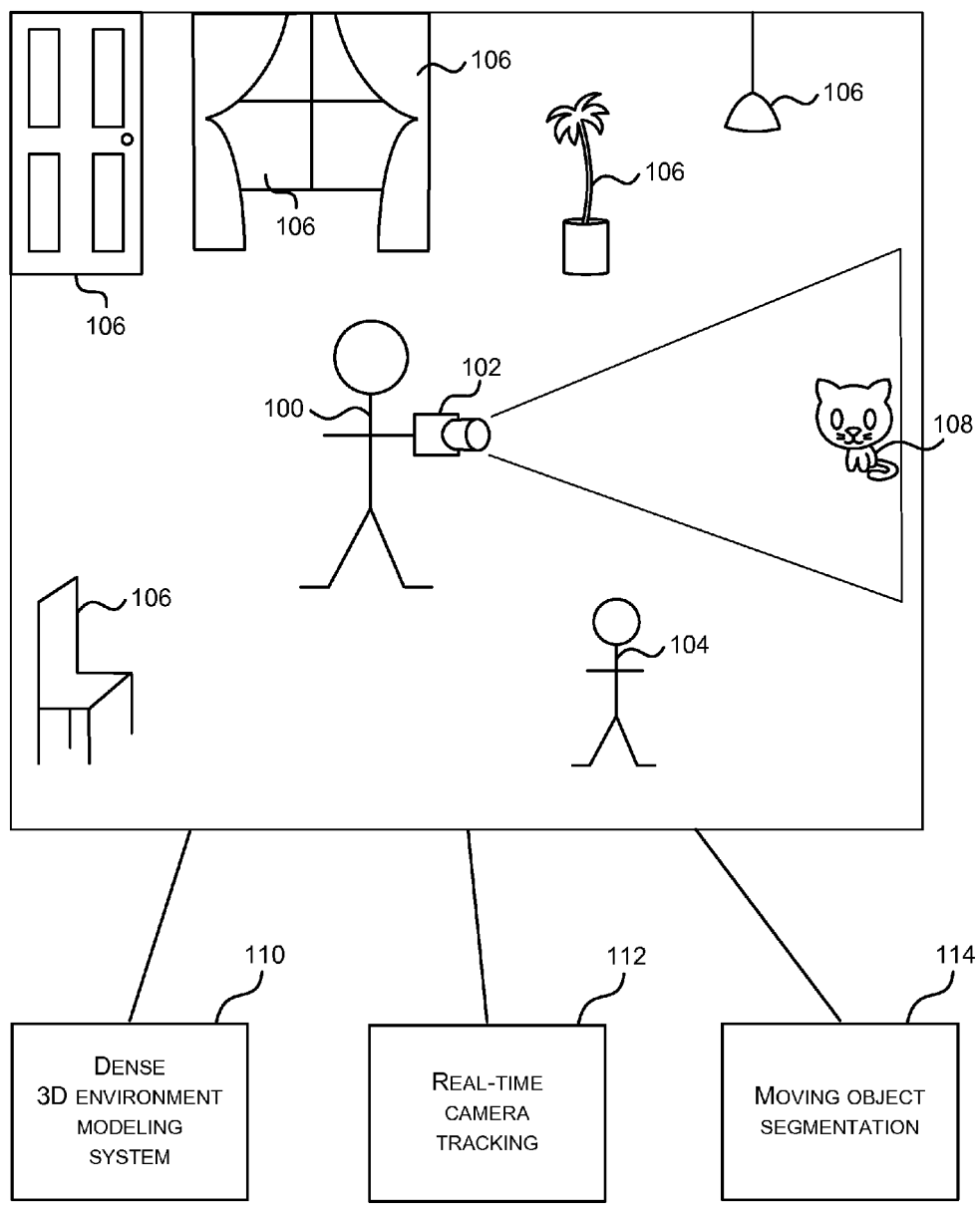
FIG. 1 illustrates a schematic diagram of a person in a room holding a mobile depth camera which may be used to generate a 3D model or map of the room.

FIG. 1 is a schematic diagram of a person 100 standing in a room and holding a mobile depth camera 102. The room contains various objects 106 such as a chair, door, window, plant, light, another person 104, and a cat 108. Many of the objects 106 are static although some of the objects such as the person 104 and cat 108 may move. As the person moves around the room, the mobile depth camera captures depth images of the room and the objects.

A real-time camera tracking system 112 monitors the location and orientation of the camera in the room. The real-time camera tracking system 112 may be integral with the mobile depth camera 102 or may be at another location provided that it is able to receive communication from the mobile depth camera 102, either directly or indirectly. For example, the real-time camera tracking system 112 may be provided at a personal computer, dedicated computer game apparatus, or other computing device in the room and in wireless communication with the mobile depth camera 102. In other examples the real-time camera tracking system 112 may be elsewhere in the building or at another remote location in communication with the mobile depth camera 102 using a communications network of any suitable type.

A moving-object segmentation system 114 receives the depth images captured by the mobile depth camera 102, and performs a segmentation operation to identify objects in the depth images that are moving or being manipulated and which are independent of the relatively unchanging background. For example, the person 104 or cat 108 can move, and hence are segmented as foreground moving objects and differentiated from background objects such as the door and window. In addition, otherwise static objects can be manipulated. For example the person 100 can move the chair, which triggers the segmentation system to detect the movement and segment the chair from the depth image as a foreground object. This can, for example, allow objects to be segmented and included in the game-play of a gaming system.

The real-time camera tracking system 112 provides input to the moving-object segmentation system 114. The input from the real-time camera tracking system 112 enables the object segmentation to be performed in real-time, without demanding excessive computational resources, as described in more detail below.

Optionally, the mobile depth camera 102 is in communication with a dense 3D environment modeling system 110 (the environment in this case is the room). "Dense" in this example refers to a high degree of accuracy and resolution of the model. For example, images captured by the mobile depth camera 102 are used to form and build up a dense 3D model of the environment as the person moves about the room.

The real-time camera tracking system 112 provides input to the dense 3D modeling system, in order to allow individual depth images to be built up into an overall 3D model. The moving-object segmentation system 114 can also provide input to the dense 3D model, such that objects in the 3D model are segmented and labeled. The real-time camera tracking system 112 may also track the position of the camera in relation to the 3D model of the environment. The combination of camera tracking and 3D modeling is known as simultaneous localization and mapping (SLAM).

The outputs of the real-time camera tracking system 112, moving-object segmentation system 114, and dense 3D modeling system 110 may be used by a game system or other application, although that is not essential. For example, as mentioned, modeled and segmented real-world objects can be included in a gaming environment.

Figure 2:
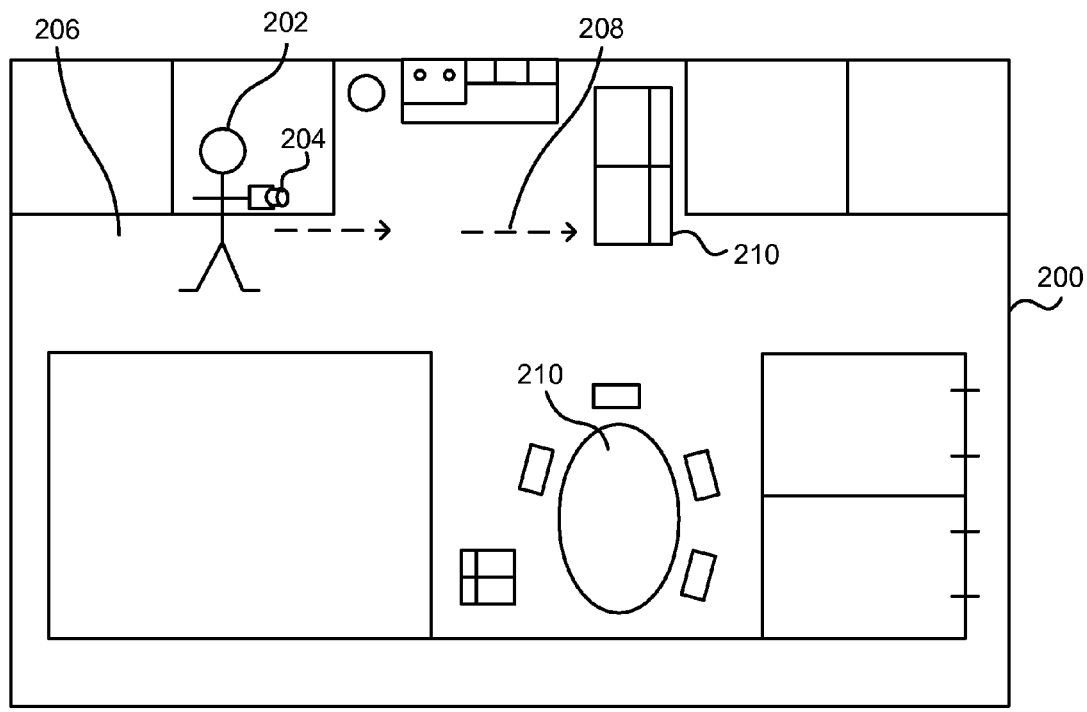
FIG. 2 illustrates a plan view of a floor of a building which is being explored by a person holding a mobile depth camera.

As a further example, FIG. 2 illustrates a plan view of a floor 200 of a building. A person 202 holding a mobile depth camera 204 is moving around the floor as indicated by dotted arrows 208. The person walks along a corridor 206 past rooms and furniture 210. The real-time camera tracking system 112 is able to track the position of the mobile depth camera 204 as it moves and the 3D modeling system generates a 3D model or map of the floor. The moving-object segmentation system 114 detects foreground objects and labels them in the depth map, enabling these objects to be separately processed as desired. It is not essential for a person 202 to carry the mobile depth camera 204. In other examples the mobile depth camera 204 is mounted on a robot or vehicle. This also applies to the example of FIG. 1.

Figure 3:
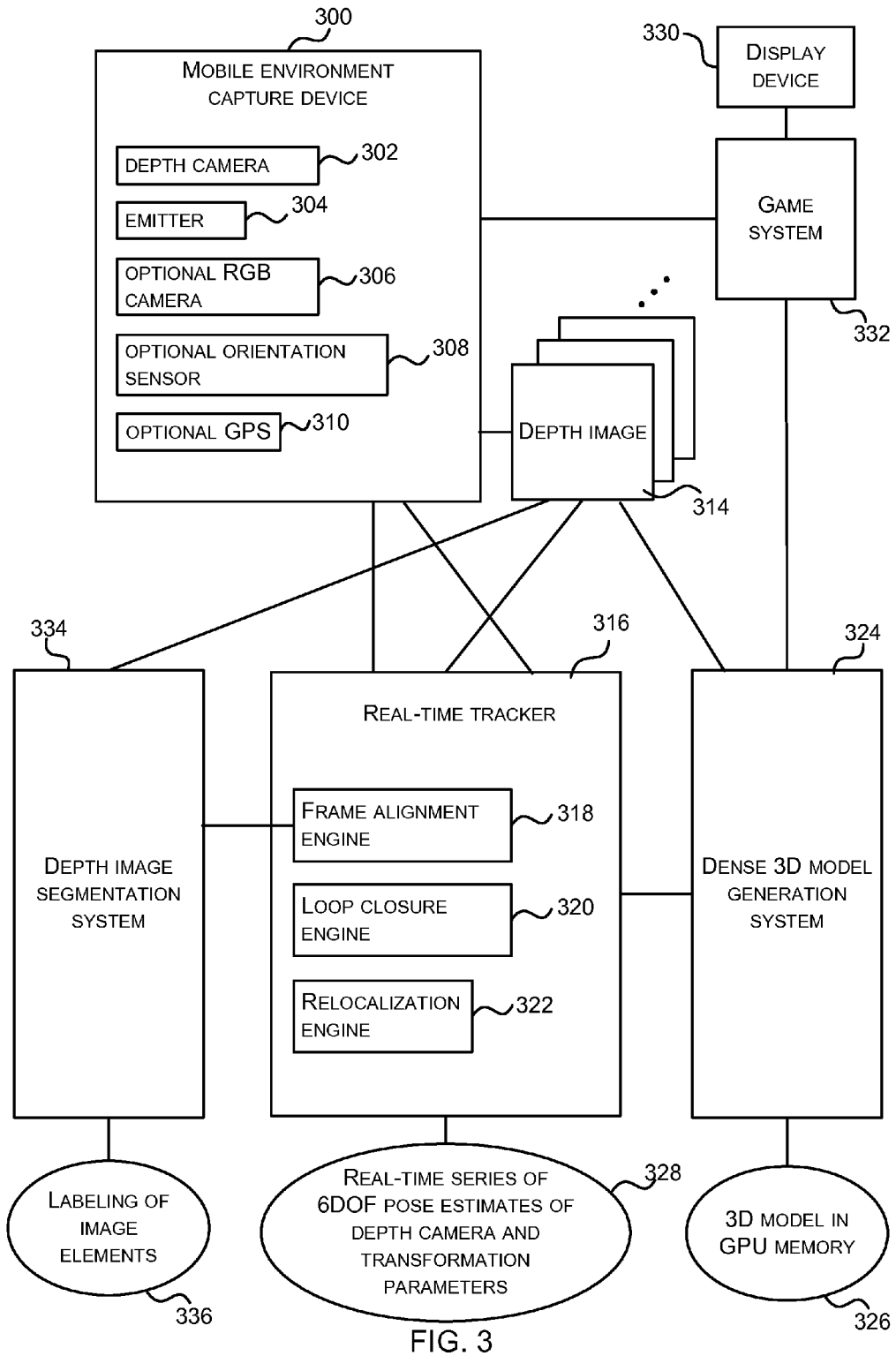
FIG. 3 illustrates a schematic diagram of a mobile depth camera connected to a real-time camera tracking system, a dense 3D model formation system and a game system.

FIG. 3 is a schematic diagram of a mobile environment capture device 300 for use with a real-time tracker 316, depth image segmentation system 334, and optionally a dense model generation system 324 and game system 332. The mobile environment capture device 300 comprises a depth camera 302 which is arranged to capture sequences of depth images of a scene. Each depth image 314 (or depth map frame) comprises a two dimensional image in which each image element (i.e. pixel) comprises a depth value such as a length or distance from the camera to an object in the captured scene which gave rise to that image element. This depth value may be an absolute value provided in specified units of measurement such as meters, or centimeters or may be a relative depth value. In each captured depth image 314 there may be around 300,000 or more image elements each having a depth value. The frame rate of the depth camera 302 is high enough to enable the depth images to be used for working robotics, computer gaming or other applications. For example, the frame rate may be in the range of 20 or more frames per second.

The depth information may be obtained using any suitable technique including, but not limited to, time of flight, structured light, and stereo images. The mobile environment capture device 300 may also comprise an emitter 304 arranged to illuminate the scene in such a manner that depth information may be ascertained by the depth camera 302.

For example, in the case that the depth camera 302 is an infra-red (IR) time-of-flight camera, the emitter 304 emits IR light onto the scene, and the depth camera 302 is arranged to detect backscattered light from the surface of one or more objects in the scene. In some examples, pulsed infrared light may be emitted from the emitter 304 such that the time between an outgoing light pulse and a corresponding incoming light pulse may be detected by the depth camera and measure and used to determine a physical distance from the environment capture device 300 to a location on objects in the scene. Additionally, in some examples, the phase of the outgoing light wave from the emitter 304 may be compared to the phase of the incoming light wave at the depth camera 302 to determine a phase shift. The phase shift may then be used to determine a physical distance from the mobile environment capture device 300 to a location on the objects by analyzing the intensity of the reflected beam of light over time via various techniques including, for example, shuttered light pulse imaging.

In another example, the mobile environment capture device 300 can use structured light to capture depth information. In such a technique patterned light (e.g. light displayed as a known pattern such as spots, a grid or stripe pattern, which may also be time-varying) may be projected onto a scene using the emitter 304. Upon striking the surface of objects in the scene the pattern becomes deformed. Such a deformation of the pattern is captured by the depth camera 302 and analyzed to determine an absolute or relative distance from the depth camera 302 to the objects in the scene.

In another example, the depth camera 302 comprises a pair of stereo cameras such that visual stereo data is obtained and resolved to generate relative depth information. In this case the emitter 304 may be used to illuminate the scene or may be omitted.

In some examples, in addition to the depth camera 302, the mobile environment capture device 300 comprises a color video camera referred to as a red-green-blue (RGB) camera 306. The RGB camera 306 is arranged to capture sequences of images of the scene at visible light frequencies.

The mobile environment capture device 300 may comprise an orientation sensor 308 such as an inertial measurement unit (IMU), accelerometer, gyroscope, compass or other orientation or movement sensor 308. However, it is not essential to use an orientation or movement sensor. The mobile environment capture device 300 may comprise a location tracking device such as a GPS, although this is not essential.

Optionally, the mobile environment capture device also comprises one or more processors, a memory and a communications infrastructure as described in more detail below. The mobile environment capture device may be provided in a housing which is shaped and sized to be hand held by a user or worn by a user. In other examples the mobile environment capture device is sized and shaped to be incorporated or mounted on a vehicle, toy or other movable apparatus.

The mobile environment capture device 300 is connected to a real-time tracker 316. This connection may be a physical wired connection or may use wireless communications. In some examples the mobile environment capture device 300 is connected indirectly to the real-time tracker 316 over one or more communications networks such as the internet.

The real-time tracker 316 may be computer-implemented using a general purpose microprocessor controlling one or more graphics processing units (GPUs). It comprises a frame alignment engine 318 and optionally a loop closure engine 320 and a relocalization engine 322. The real-time tracker 316 takes depth image frames from the depth camera 302, and optionally also input from the mobile environment capture device 300, and optional map data 334. The real-time tracker 316 operates to place the depth image frames into spatial alignment in order to produce a real-time series 328 of six degree of freedom (6DOF) pose estimates of the depth camera 302. It may also produce transformation parameters for transforms between pairs of depth image frames. In some examples the real-time tracker operates on pairs of depth image frames 314 from the depth camera. In other examples, the real-time tracker 216 takes a single depth image 314 and aligns that with a dense 3D model 326 of the environment rather than with another depth image.

The frame alignment engine 318 of the real-time tracker is arranged to align pairs of depth image frames, or a depth image frame and an estimate of a depth image frame from the dense 3D model. It uses an iterative process which can be implemented using one or more graphics processing units in order that the frame alignment engine operates in real-time. The loop closure engine 320 is arranged to detect when the mobile environment capture device has moved in a loop so that the scene depicted in the current depth frame is at least partially overlapping with that of a previous depth frame. For example, this may occur when a user walks around the whole floor of the building in FIG. 2 and reaches the starting point again. It may also occur when a user moves around a room behind some furniture and out again to the original start position, or close to that original start position. The relocalization engine 322 is arranged to deal with the situation where the real-time tracker loses the current location of the mobile environment capture device 300 and relocalizes or finds the current location again.

The frame alignment engine 318 of the real-time tracker 316 provides an output to the depth image segmentation system 334. The depth image segmentation system 334 uses at least a portion of the algorithms of the real-time tracker 316 to detect when objects have moved within the depth image, and segments these objects in the depth image as foreground objects. The output of the depth image segmentation system 334 is a set of labeled image elements 336 for the depth image, indicating which image elements correspond to segmented foreground objects. The process for performing the segmentation using the results of the real-time camera tracking are described in more detail below with reference to FIG. 4 to 6. Note that in other examples, the segmentation can be performed without input from camera tracking system, by implementing a portion of the tracking algorithm as described in more detail below.

The real-time tracker 316 may also provide the camera pose as output to an optional dense 3D model generation system 324 which uses that information together with the depth image frames to form and store a dense 3D model 326 of the scene or environment in which the mobile environment capture device 300 is moving. For example, in the case of FIG. 1 the 3D model would be a 3D model of the surfaces and objects in the room. In the case of FIG. 2 the 3D model would be a 3D model of the floor of the building. The dense 3D model may be stored in graphics (GPU) memory.

The mobile environment capture device 300 may be used in conjunction with a game system 332 which is connected to a display device 330. For example, the game may be a FPS game, golf game, boxing game, motor car racing game or other type of computer game. The segmented depth images (or optionally the dense 3D model and segmentation information) may be provided to the game system 332, and aspects of the model incorporated into the game. For example, the 3D model can be used to determine the shape and location of objects in a room, which can be used with camera-based games to improve background removal or incorporated into the game itself (e.g. as in-game objects that the player can interact with). Data from the game system 332 such as the game state or metadata about the game may also be provided to the real-time tracker 316.

As mentioned, the processing performed by the real-time tracker 316 and/or the dense 3D model generation system 324 can, in one example, be executed remotely from the location of the mobile environment capture device 300. For example, the mobile environment capture device 300 can be connected to (or comprise) a computing device having relatively low processing power, and which streams the depth images over a communications network to a server. The server has relatively high processing power, and performs the computationally complex tasks of the real-time tracker 316 and/or the dense 3D model generation system 324. The server can return a rendered image of the dense reconstruction per-frame to provide an interactive experience to the user, and also return the final dense 3D reconstruction on completion of the model, for subsequent local use (e.g. in a game). Such an arrangement avoids the need for the user to possess a high-powered local computing device.

Figure 4:
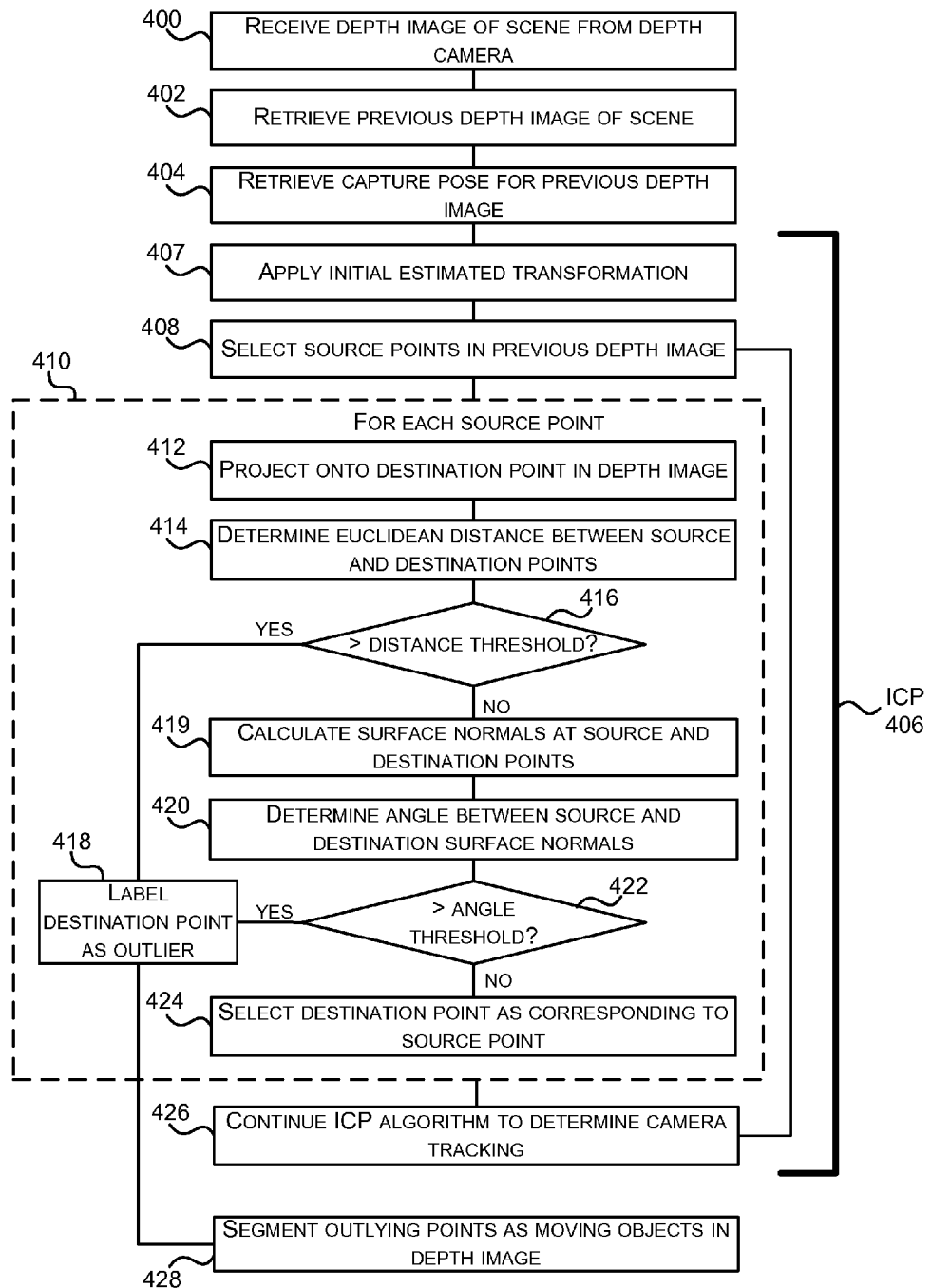
FIG. 4 illustrates a flowchart of a process for segmenting a moving object from a depth image.

Reference is now made to FIG. 4, which illustrates a flowchart of a process for segmenting a moving object from a depth image. The segmentation operation shown in FIG. 4 reutilizes part of an algorithm performed during the real-time camera tracking described above, and this allows at least part of the segmentation operation to be performed with little extra computational overhead. In alternative examples, the segmentation operation described here can be implemented without a camera-tracking system, in which case the segmentation system implements the relevant portion of the tracking algorithm as shown in FIG. 4.

Firstly, a depth image of the scene to be segmented (as captured by the mobile depth camera) is received 400. If the segmentation operation is making use of the camera-tracking results, then this current depth image is received at the frame alignment engine 318. The current depth image is also known as the destination depth image. A previous depth image of at least a portion of the scene is then retrieved 402. The previous depth image is also known as the source depth image. In some examples, the previous depth image may be the preceding frame captured by the depth camera and stored at a storage device. In alternative examples, the previous depth image may be generated from the dense 3D model stored in graphics memory by requesting the previous depth image from the GPU. The GPU can generate the previous depth image from the dense 3D model stored on the graphics memory by determining the view from a virtual camera at the last known location and orientation of the real depth camera looking into the dense 3D model. The use of the dense 3D model provides a higher resolution previous depth image.

The capture pose (i.e. location and orientation) for the previous depth image is also retrieved 404. If the previous depth image is the preceding frame captured by the depth camera, then the capture pose is the pose of the depth camera at the time of capturing the preceding frame, as determined by the real-time camera tracker. Alternatively, if the previous depth image is generated from a dense 3D model, a rendering of a mesh model, or other 3D representation, then the capture pose is the location and orientation of the virtual camera.

Once the current depth image is received, and the previous depth image and capture pose are retrieved, then the frame alignment engine 318 executes an algorithm to determine a transformation between the previous and current depth images, and hence determine how the mobile depth camera has moved between the two depth images. From the capture pose of the previous depth image, this enables determination of the current depth camera pose. This transformation can be determined by the frame alignment engine 318 of the real-time tracker 316 using an iterative closest point (ICP) algorithm. Broadly speaking, the ICP algorithm is an iterative process that determines a set of corresponding points between the two depth images, determines a transformation that minimizes an error metric over the corresponding points, and repeats the process using the determined transformation until convergence is reached.

When the ICP algorithm is determining the corresponding points between the two depth images at each iteration, points may be found that diverge substantially between the images. These are known as "outliers". During the camera tracking operation, these outlying points may be ignored or rejected. However, these outlying points are used as useful input to the segmentation operation.

The portions of the ICP algorithm that are relevant to the determination of outliers are indicated by brace 406 in FIG. 4. Note that the execution of the ICP algorithm for the purposes of camera tracking may involve further additional operations not shown in FIG. 4.

An initial estimation of the transformation for aligning the current and previous depth images is applied 407. This initial estimate is formed in any suitable manner. For example, a motion path for the depth camera can be determined from previously determined camera pose estimates, and used with a predictive model to provide a coarse estimate the pose at the current time (e.g. using constant velocity or acceleration predictive models). Additionally or alternatively, in further examples, one or more of the following sources of information may be used to form the initial estimate: game state, game meta data, map data, RGB camera output, orientation sensor output, and GPS data.

A set of source points (i.e. pixels) in the previous depth image are selected 408 for analysis. In some examples, this set of source points can be all the pixels in the previous depth image. In other examples, a representative subset of the pixels in the previous depth image can be selected to reduce the complexity. The operations indicated by box 410 are then performed for each of the source points. Note that because the same operations are being performed for each source point, a substantial amount of parallelism exists in the execution of the ICP algorithm. This enables the ICP algorithm to be efficiently executed on a GPU, as discussed below with reference to FIG. 7.

Figure 5:
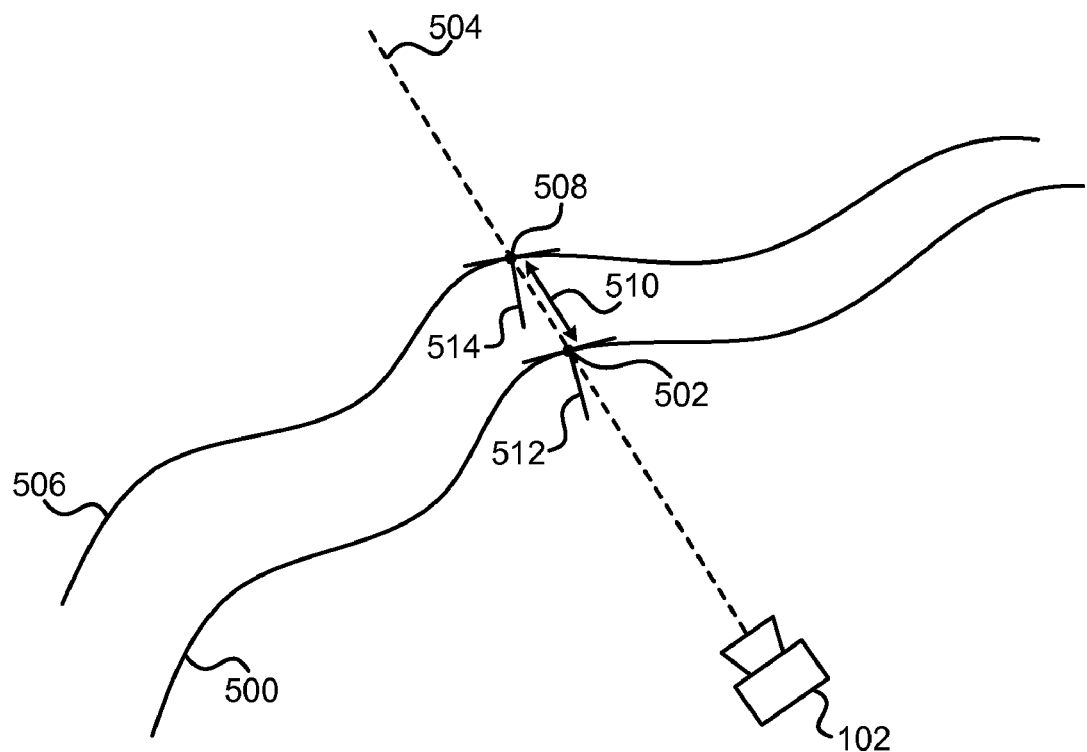
FIG. 5 illustrates an example determination of a corresponding point of an iterative closest point algorithm.
Figure 6:
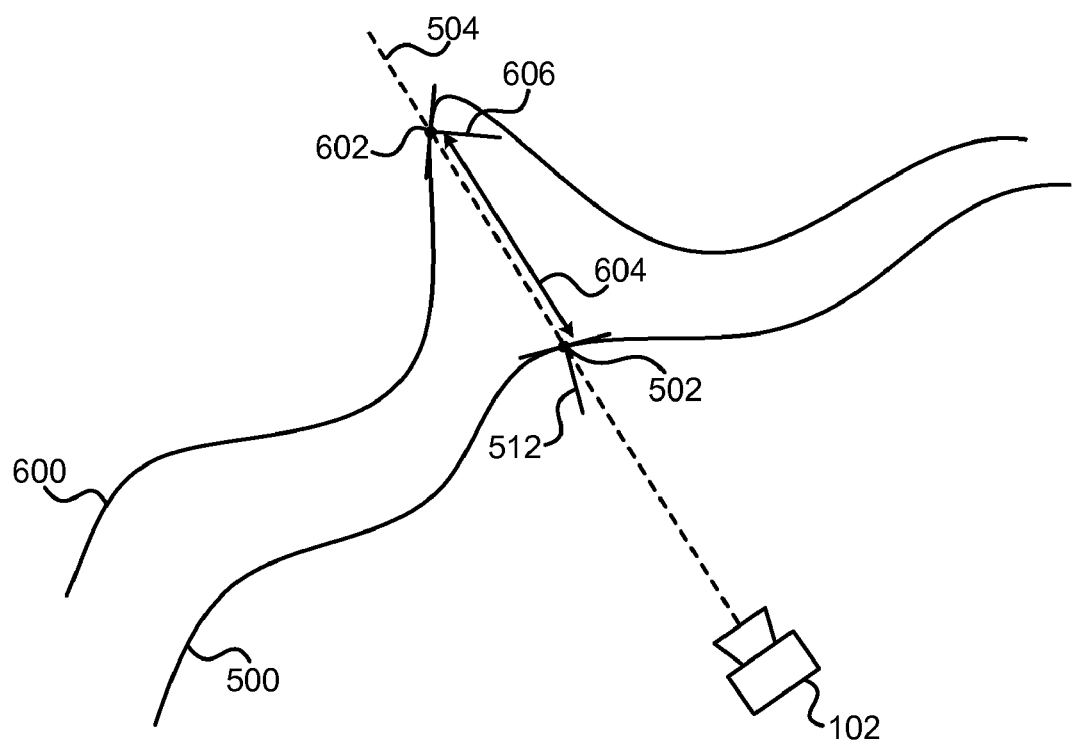
FIG. 6 illustrates an example determination of an outlying point during execution of an iterative closest point algorithm.

The operations performed in box 410 are illustrated with reference to examples shown in FIGS. 5 and 6. FIGS. 5 and 6 show an example previous (source) depth image and current (destination) depth image in two dimensions only, for clarity. These examples illustrate how points on the two depth images are determined to be corresponding points (in the case of FIG. 5) or outlying points (in the case of FIG. 6).

FIGS. 5 and 6 both show a previous depth image 500 and source point 502 under consideration. Referring again to box 410 of FIG. 4, firstly the ICP algorithm maps a destination point on the current depth image to the source point on the previous depth image. This is done by projecting 412 a destination point through the camera projection of the source point of the previous depth map. This is illustrated by camera projection 504 in FIGS. 5 and 6, which projects from the capture pose of the previous depth image (e.g. from the location and orientation of the depth camera 102 when capturing the previous depth image) through the source point 502. This projection process may be referred to as "projective data association".

In FIG. 5, the camera projection 504 intersects current depth image 506 at a destination point 508. In FIG. 6, the camera projection 504 intersects current depth image 600 at a destination point 602. In some examples, a plurality of destination points can be selected close to the projected point, and each of these destination points considered separately. However, for the purposes of this example, only a single destination point is selected for each source point. Note that, in other examples, the current depth image, and hence the destination point can between the source point and the depth camera 102.

Two compatibility tests are then performed on the source and destination points to determine whether they are corresponding points or outliers. In the first compatibility test, a Euclidean distance is determined 414 between the source and destination points. This is illustrated in FIG. 5 as distance 510 and in FIG. 6 as distance 604. The Euclidean distance is then compared 416 to a predefined distance threshold. If the destination point is too far away from the source point, then it is considered to be an outlier (i.e. non-corresponding) for the purposes of the ICP algorithm, and is labeled 418 as such. In one example, the predefined distance threshold is 15 cm, although any suitable value can be used.

The example of FIG. 5 shows the case where the distance 510 between the source and destination points is small, and is less than the predefined distance threshold (and hence is not labeled as an outlier at this stage). Conversely, the example of FIG. 6 shows the case where differences between the previous depth image 500 and the current depth image 600 (e.g. due to new or moving objects) result in the distance 604 between the source and destination points being greater than the predefined distance threshold, and hence the destination point is labeled as an outlier.

If the Euclidean distance is found to be within the predefined distance threshold, then the second compatibility test is performed. To perform this test, the surface normals are calculated 419 at the source and destination points. For example, this is achieved for a given point by finding the four (or more) nearest neighbor points in the depth image and computing a surface patch which incorporates those neighbors and the point itself. A normal to that surface patch is then calculated at the location of the point. FIG. 5 illustrates surface normal 512 for the source point 502 and surface normal 514 for the destination point 508. FIG. 6 illustrates a different surface normal 606 for destination point 602.

The angle between the surface normal of the source point and the destination point is then determined 420. In alternative examples, a different measure relating to the angle, such as the dot product, can be calculated.

The calculated angle (or other measure) is then compared 422 to a predefined angle threshold. If the angle is greater than the predefined angle threshold, then the destination point is considered to be an outlier, and labeled 418 as such. Conversely, if the angle is not greater than the predefined angle threshold, then the destination point is selected 424 as a corresponding point to the source point. In one example, the predefined angle threshold is 30 degrees, although any suitable value can be used.

Referring to FIG. 5, the angle between the source surface normal 512 and destination surface normal 514 is small, and hence these are considered to be corresponding points in this example. Conversely, in FIG. 6, the angle between the source surface normal 512 and the destination surface normal 606 is larger, and taken to be greater than the predefined angle threshold in this example, and hence the destination point is labeled as an outlier (ignoring that this destination point was already labeled as an outlier due to exceeding the distance threshold).

Following the two compatibility tests outlined above, the ICP algorithm continues 426 to determine the camera tracking transform. For example, the ICP algorithm finds the transform that minimizes the error metric for the selected corresponding points, and then repeats the process of finding corresponding points given that transform until convergence is reached.

However, rather than discarding the outlying points, these are stored and provided as input to the object segmentation system. The outlying points indicate points in the depth image where something has changed since the previous depth image. Such a change can be caused by dynamic or non-rigid objects giving rise to different depth measurements. In one example, the object segmentation can simply segment 428 all the outlying points and label these as foreground objects in the depth image. This provides a very rapid segmentation of the depth image that uses very little additional computation over that performed for the camera tracking anyway.

Note that in the example described above with reference to FIG. 4 all outlying points that are found during the real-time camera tracking are used as input to the object segmentation operation. However, in alternative examples, only a subset of the outliers detected may be utilized. For example, only those outliers found during the final iteration (or a final fraction of the iterations) of the ICP algorithm may be used.

In some examples, further tests can be performed on the detected outliers prior to segmenting the image. For example, RGB images of the scene (as captured by RGB camera 306 at the same time as the depth image) can be used in a further comparison. Two RGB images corresponding to the current and previous depth images can be compared at the ICP outliers for RGB similarity. If this comparison indicates a difference in RGB value greater than a predefined value, then this is a further indication that an object has moved at this location, and trigger segmentation of the image.

In other examples, further additional processing can be performed to segment the depth image, which utilizes the outlying points as input. For example, the outlying points can be used as input to known segmentation algorithms. Such segmentation algorithms include those based on computer vision techniques such as graph cut algorithms, object boundary detection algorithms (such as edge detection), GrabCut, or other morphological operations such as erode/dilate/median filter, and/or those based on machine learning, such classifiers (e.g. decision trees or forests). Note that many known segmentation algorithms are configured to operate on RGB or grey-scale values in images. In this example, these can be modified to operate on the 3D volumetric representation (e.g. on the rate of change or curvature of the 3D surface).

The outlying points provide useful information to these algorithms, as they indicate an area of interest in which a change in the depth image has occurred. This allows these higher-level segmentation algorithms to focus on the region of the outliers, thereby saving computational complexity relative to analyzing the entire depth image. For example, the segmentation algorithms can analyze a predefined region surrounding the outlying points. In other examples, user input can also be used to enhance the segmentation by prompting a user to manually indicate whether an object detected by the outliers is an independent, separable object from the background.

In a further example, the outlying points can be used in combination with an RGB image of the scene (e.g. captured by RGB camera 306 at the same time as the depth image). For example, the corresponding location to the outlying points in the RGB image can be located, and a higher-level segmentation algorithm (such as GrabCut or edge detection) applied to the RGB image at the location of the outliers. This can be useful where the RGB image reveals more information about the object than the depth image outliers. For example, if an object is moving by rotation about an axis substantially parallel to the view of the depth camera, then outliers are detected around the edges of the object, but not at the centre of the object (as this has not moved between depth images). However, by analyzing the RGB image at the location of the outliers, the full extent of the object may be distinguished, and the centre of the object also correctly segmented.

In other examples, after the depth image has been segmented, it can be further processed to provide additional data to the system (e.g. gaming system) in which the depth images are used. For example, the segmentation of moving objects enables these moving objects to be tracked separately and independently of the background. This can be achieved by executing a further ICP algorithm on the portion of the depth image that was identified as a moving object by the segmentation system. In this way, the motion of the moving object can be separately tracked and monitored from the background.

In the case of non-rigid, deformable moving objects, the independent tracking of objects using an ICP algorithm becomes more complex as the shape of the object itself can change and hence the ICP cannot find a movement transformation for that object that matches this. In such cases, a piece-wise rigid body approximation can be used, such that the deformable object is represented by a plurality of rigid objects. Such a piece-wise rigid body approximation can be performed dynamically and in real-time, by starting with the assumption that all objects are rigid, and then breaking the object into piece-wise sections as this assumption breaks down (e.g. when the ICP algorithm fails to find a transformation). This can be expressed as a recursive version of the segmentation algorithm described above, in which the ICP algorithm is executed on all pixels, then executed again only on the segmented pixels (the outliers), then again only on the sub-segmented pixels, etc., until no more segmented pixels are found (or a limit is reached).

As well as independently tracking a moving object in the depth image, an independent dense 3D model of the object can also be generated. This can be performed in a similar manner to the generation of the overall dense 3D model of the scene as outlined above. For example, a portion of graphics memory can be allocated to represent the object and arranged as a 3D volume. As the moving object is independently tracked, the depth image data about the object (as segmented) can be aligned with previous measurements of the object and combined in the volume. In this way, a more detailed 3D model of the moving object is constructed, which can be used, for example, when displaying a representation of the object on-screen or for object recognition purposes.

The creation of a dense 3D model of a segmented objects can be performed in a number of ways. In a first example, after the outliers have been detected (as described above), the outlying points are integrated into a separate 3D volume in memory if they lie in front of a surface along the camera ray when compared to the previous depth image (which can itself be generated from the dense 3D model as noted above). This technique enables an ICP algorithm to track the segmented object once it has been sufficiently integrated into the separate 3D volume, and provides good performance for new objects that are added into the scene. In a second example, after the outliers have been detected (as described above), every voxel in the dense 3D model within the camera's frustum (i.e. not only the front faces which the camera sees) is projected into the current depth map. If a given voxel gets projected to an outlier and if the depth value of the outlier is larger than the depth value of the projected voxel, then the segmentation system knows that the voxel is part of a moved object (because it suddenly sees a depth point behind the voxel). This technique enables objects to be instantly segmented upon removal from the scene, and performs well for moved objects.

In further examples, the above two methods for generating a dense model of a segmented object can be combined or used selectively depending on the characteristics of the object (e.g. new or moved objects).

In further examples, the segmented objects from the depth images can be input to an object recognition system. Such an object recognition system can be in the form of a machine learning classifier, e.g. using trained decision trees. This can be utilized to automatically recognize and classify the objects in real-time. For example, with reference to FIG. 1, the object recognition system can be arranged to recognize that a moving object that has been segmented is a cat 108. In some example, the user can "scan" an object (such as a chair) into the dense 3D reconstruction, and this scanned object can be used as part of the object recognition system to detect and classify other similar objects.

In some examples, the detected points can classified not by what they represent (cat, chair, etc.) but by their behavior in the scene. For example, a coffee cup is a separate, independent rigid object relative to other objects in the scene. Conversely, a door is a separate movable object, but is attached to the wall, and hence is constrained in its movement. Higher level analysis of the points indicated by the ICP outliers can enable these points to be classified as, for example, independent, attached, or static.

Once a segmented object has been identified, this information can be used to control further aspects of the operation of the system. For example, certain objects can be arranged to directly interact within a computer game environment, whereas others can be deliberately ignored. The object identification can also be used to control the display of objects (e.g. on display device 330). For example, when an object has been identified, the low-resolution depth (or RGB) image of the object can be substituted for a high-resolution model of the object (or facets of the object).

In one example, the faces of users of the system can be identified, and substituted with high-resolution images of these user's faces, mapped onto the depth images. In a further example, these high-resolution images of the user's faces can be parameterized such that their facial expressions are under computer control. In this way, detailed and life-like avatars can be generated, that accurately follow the movement of the users. Similarly, a 3D representation of a user's body can be generated from a parameterized model, and this 3D body representation can have facial expressions substituted in that are captured from the depth camera (and/or from the RGB camera).

In a further example, following segmentation the region of the dense 3D model which was previously "joined" to the now-moved object can be tagged (e.g. the location where a moved coffee cup base rested on the table). This tagging can indicate that this region in the model is a likely "border surface". The tagging can comprise associating additional data to those points in the model that indicate a potential surface. By doing this, if some unknown object is placed on that area (or at least partially on that area) at some point in the future, then the system already knows that these are likely to be two detached objects (e.g. a table and an object touching that region) that are simply in contact with each other and are separable, because of the presence of the "border surface" between them.

The tagging of "border surfaces" this way is useful in the case in which the camera frames are not sufficiently fast to track a rapidly-moved object in the scene. In such cases the rapidly-moved object just "appears" in the model. A similar scenario is observed when an object is moved less than the above-mentioned predefined distance or angle threshold, in which case the movement may not be detected. However, if the object contacts a tagged border surface, then this can trigger a more detailed analysis/processing whereby the object can be assumed to be a detachable/separable object despite not meeting the basic distance or angle thresholds.

Figure 7:
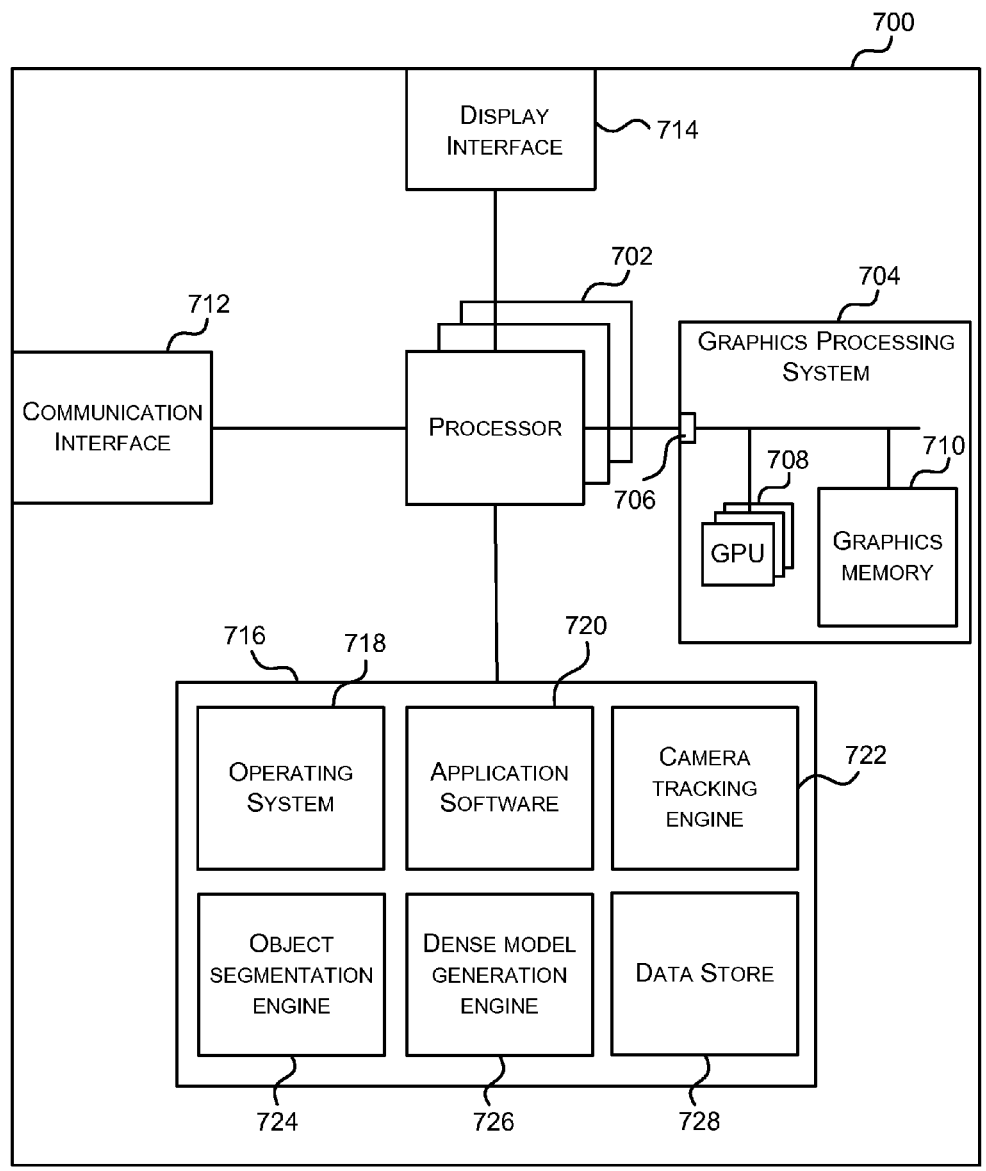
FIG. 7 illustrates an exemplary computing-based device in which embodiments of the object segmentation technique may be implemented.

Reference is now made to FIG. 7, which illustrates various components of an exemplary computing-based device 700 which may be implemented as any form of a computing and/or electronic device, and in which embodiments of the above-described moving object image segmentation techniques may be implemented.

Computing-based device 700 comprises one or more processors 702 which may be microprocessors, controllers or any other suitable type of processors for processing computing executable instructions to control the operation of the device in order to perform moving object image segmentation. In some examples, for example where a system on a chip architecture is used, the processors 702 may include one or more fixed function blocks (also referred to as accelerators) which implement a part of the modeling methods in hardware (rather than software or firmware).

The computing-based device 700 also comprises a graphics processing system 704, which communicates with the processors 702 via an interface 706, and comprises one or more graphics processing units 708, which are arranged to execute parallel, threaded operations in a fast and efficient manner. The graphics processing system 704 also comprises a graphics memory 710, which is arranged to enable fast parallel access from the graphics processing units 708. In examples, the graphics memory 710 can store the dense 3D models, and the graphics processing units 708 can perform the ICP algorithms/camera tracking and dense model generation operations described above.

The computing-based device 700 also comprises a communication interface 712 arranged to receive input from one or more devices, such as the mobile environment capture device (comprising the depth camera), and optionally one or more user input devices (e.g. a game controller, mouse, and/or keyboard). The communication interface 712 may also operate as a networking interface, which can be arranged to communicate with one or more communication networks (e.g. the internet).

A display interface 714 is also provided and arranged to provide output to a display system integral with or in communication with the computing-based device. The display system may provide a graphical user interface, or other user interface of any suitable type although this is not essential.

The computer executable instructions may be provided using any computer-readable media that is accessible by computing based device 700. Computer-readable media may include, for example, computer storage media such as memory 716 and communications media. Computer storage media, such as memory 716, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (memory 716) is shown within the computing-based device 700 it will be appreciated that the storage may be distributed or located remotely and accessed via a network or other communication link (e.g. using communication interface 712).

Platform software comprising an operating system 718 or any other suitable platform software may be provided at the computing-based device to enable application software 720 to be executed on the device. The memory 716 can store executable instructions to implement the functionality of a camera tracking engine 722 (e.g. arranged to track the location and orientation of the depth camera using ICP), an object segmentation engine 724 (e.g. arranged to segment moving objects from the depth image using the ICP outliers), and optionally a dense model generation engine 726 (e.g. arranged to generate a dense 3D model of the scene or objects in graphics memory). The memory 716 can also provide a data store 728, which can be used to provide storage for data used by the processors 702 when performing the segmentation techniques, such as for storing previously captured depth images and capture poses.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method of segmenting a moving object from a background portion of a depth image, comprising:
   receiving the depth image from a mobile depth camera, the depth image comprising a depth value at each image element, each depth value being related to a distance from the depth camera to a surface in a scene captured by the depth camera;
   retrieving a previous depth image of at least a portion of the scene;
   executing an iterative closest point algorithm using the depth image and the previous depth image, wherein the iterative closest point algorithm comprises a determination of a plurality of corresponding points in the depth image and the previous depth image; and detecting one or more outlying points during the determination of the plurality of corresponding points, and labeling those image elements in the depth image at the outlying points as moving object image elements.

2. A method according to claim 1, wherein the step of executing the iterative closest point algorithm further comprises using the corresponding points to determine a transformation for aligning the depth image with the previous depth image.

3. A method according to claim 2, wherein the step of executing the iterative closest point algorithm further comprises using the transformation to track the location and orientation of the depth camera, and storing the location and orientation in association with the depth image.

4. A method according to claim 1, wherein the step of detecting one or more outlying points during determination of the plurality of corresponding points comprises:

selecting a source point from the previous depth image; and
mapping the source point to a destination point in the depth image.

5. A method according to claim 4, wherein the step of detecting one or more outlying points during determination of the plurality of corresponding points further comprises determining whether a distance between the source point and the destination point is greater than a predefined distance threshold.

6. A method according to claim 4, wherein the step of detecting one or more outlying points during determination of the plurality of corresponding points further comprises:

determining a first surface normal at the source point and a second surface normal at the destination point;
calculating a measure relating to the angle between the first surface normal and second surface normal; and
determining whether the measure is greater than a predefined angle threshold.

7. A method according to claim 4, wherein the step of detecting one or more outlying points during determination of the plurality of corresponding points further comprises:

determining whether a distance between the source point and the destination point is greater than a predefined distance threshold; and
if it is determined that the distance is not greater than the predefined distance threshold: determining a first surface normal at the source point and a second surface normal at the destination point, calculating an angle between the first surface normal and second surface normal, and determining whether the angle is greater than a predefined angle threshold.

8. A method according to claim 4, wherein the step of detecting one or more outlying points during determination of the plurality of corresponding points further comprises:

accessing a first red-green-blue image corresponding to the depth image and a second red-green-blue image corresponding to the previous depth image; and
determining whether the difference between the red-green-blue value at the source point of the second red-green-blue image and the destination point of the first red-green-blue image is greater than a predefined value.

9. A method according to claim 4, further comprising retrieving a previous capture location and orientation for the previous depth image.

10. A method according to claim 9, wherein step of mapping the source point to the destination point comprises projecting onto the destination point from the previous capture location and orientation and the source point.

11. A method according to claim 1, further comprising executing a segmentation algorithm using the labeled image elements at the outlying points to identify further image elements belonging to the moving object in the depth image.

12. A method according to claim 11, wherein the segmentation algorithm is performed on a red-green-blue image of the scene captured concurrently with the depth image.

13. A method according to claim 11, wherein the segmentation algorithm comprises at least one of: a GrabCut algorithm; a machine-learning classifier; an object boundary detection algorithm; and a morphological operation.

14. A method according to claim 1, further comprising the step of executing an additional iterative closest point algorithm to determine a transformation for aligning only the moving object in the depth image with the previous depth image.

15. A method according to claim 1, further comprising the steps of identifying the moving object using an object recognition algorithm, and substituting the moving object in the depth image with a high-resolution representation of the moving object.

16. An image segmentation system, comprising:

a communication interface arranged to receive a depth image from a mobile depth camera, the depth image comprising a depth value at each image element, each depth value being related to a distance from the depth camera to a surface in a scene captured by the depth camera;

a memory arranged to store a previous depth image of at least a portion of the scene; and a processor arranged to: execute an iterative closest point algorithm using the depth image and the previous depth image, wherein the iterative closest point algorithm comprises a determination of a plurality of corresponding points in the depth image and the previous depth image; detect one or more outlying points during the determination of the plurality of corresponding points; and label those image elements in the depth image at the outlying points as moving object image elements.

17. A system according to claim 16, wherein the previous depth image was previously captured by the depth camera, received at the communication interface and stored at the memory.

18. A system according to claim 16, further comprising a graphics processing unit and an associated graphics memory arranged to store a dense 3D model of the scene, and wherein the processor is arranged to retrieve the previous depth image by requesting the previous depth image from the graphics processing unit, and the graphics processing unit is arranged to generate the previous depth image from the dense 3D model stored on the graphics memory.

19. A system according to claim 18, wherein the graphics processing unit is further arranged to create a further dense 3D model representing only the moving object in the graphics memory and augment the further dense 3D model using the labeled image elements of the moving object.

20. One or more tangible device-readable media with device-executable instructions that, when executed by a computing system, direct the computing system to perform steps comprising:

receiving a first depth image from a mobile depth camera, the first depth image comprising a depth value at each image element, each depth value being related to a distance from the depth camera to a surface in a scene captured by the depth camera;

retrieving a previous depth image of at least a portion of the scene and a capture location and orientation for the previous depth image;

executing an iterative closest point algorithm using the first depth image, the previous depth image and the capture location and orientation to determine a transformation for aligning the first depth image with the previous depth image, wherein the iterative closest point algorithm comprises a determination of a plurality of corresponding points in the first depth image and the previous depth image;

detecting one or more outlying points during the determination of the plurality of corresponding points; and subsequently processing a set of image elements in the first depth image at the outlying points as a separate object moving relative to the rest of the scene.

* * * * *